(12) United States Patent
Groat et al.

(10) Patent No.: US 12,410,992 B2
(45) Date of Patent: *Sep. 9, 2025

(54) BODY ARMOR PANEL FOR USE WITH PERSONAL PROTECTIVE VEST AND SYSTEM FOR ASSEMBLING SAME

(71) Applicant: SAFE LIFE DEFENSE, LLC, Henderson, NV (US)

(72) Inventors: Nick Groat, Las Vegas, NV (US); Brian Jones, Las Vegas, NV (US)

(73) Assignee: Safe Life Defense, L.L.C., Henderson, NV (US)

( * ) Notice: Subject to any disclaimer, the term of this patent is extended or adjusted under 35 U.S.C. 154(b) by 105 days.

This patent is subject to a terminal disclaimer.

(21) Appl. No.: 18/492,116

(22) Filed: Oct. 23, 2023

(65) Prior Publication Data
US 2024/0093973 A1 Mar. 21, 2024

Related U.S. Application Data

(63) Continuation of application No. 17/993,657, filed on Nov. 23, 2022.

(60) Provisional application No. 63/282,517, filed on Nov. 23, 2021.

(51) Int. Cl.
| | | |
|---|---|---|
| *F41H 5/04* | (2006.01) | |
| *B29C 70/22* | (2006.01) | |
| *B29K 105/10* | (2006.01) | |
| *B29K 223/00* | (2006.01) | |
| *B29K 277/00* | (2006.01) | |

(52) U.S. Cl.
CPC ......... *F41H 5/0485* (2013.01); *B29C 70/228* (2013.01); *B29K 2105/107* (2013.01); *B29K 2223/0683* (2013.01); *B29K 2277/10* (2013.01)

(58) Field of Classification Search
CPC . F41H 5/0485; F41H 1/00; F41H 1/02; F41H 5/00; F41H 5/02; F41H 5/04; F41H 5/0471; F41H 5/0478; B29C 70/228; B29K 2105/107; B29K 2223/0683; B29K 2277/10
USPC .................. 89/36.05, 36.01, 36.02
See application file for complete search history.

(56) References Cited

U.S. PATENT DOCUMENTS

| | | | |
|---|---|---|---|
| 2010/0015391 A1* | 1/2010 | Beugels | B32B 5/26 428/113 |
| 2011/0231985 A1* | 9/2011 | Bishop | A41D 13/0153 2/456 |
| 2013/0213208 A1* | 8/2013 | Compton | F41H 5/0478 89/36.02 |
| 2016/0025459 A1* | 1/2016 | Kwint | F41H 5/0428 89/36.02 |
| 2016/0116257 A1* | 4/2016 | Kim | B32B 5/12 89/36.02 |
| 2017/0010072 A1* | 1/2017 | Sriraman | F41H 5/0485 |
| 2017/0030686 A1* | 2/2017 | Rockenfeller | F41H 5/0485 |

(Continued)

*Primary Examiner* — John Cooper
(74) *Attorney, Agent, or Firm* — Howard & Howard Attorneys PLLC

(57) ABSTRACT

A personal protective vest assembly is described herein. The personal protective vest assembly includes a personal protective vest and a body armor panel positioned within the personal protective vest. The body armor panel includes a ballistic material panel assembly that includes a plurality of layered material segments defined between a strike face and a wear face. Each of the layered material segments includes a different ballistic material.

8 Claims, 19 Drawing Sheets

(56) References Cited

U.S. PATENT DOCUMENTS

2017/0314894 A1* 11/2017 Tunis, III .................. B32B 5/26
2019/0166981 A1*  6/2019 Revels ...................... A45F 3/10
2020/0363163 A1* 11/2020 Lyons ....................... F41H 1/00

* cited by examiner

BODY ARMOR PANEL FOR USE WITH PERSONAL PROTECTIVE VEST AND SYSTEM FOR ASSEMBLING SAME

CROSS-REFERENCE TO RELATED APPLICATIONS

This application is a continuation of U.S. patent application Ser. No. 17/993,657, filed Nov. 23, 2022, which claims the benefit of U.S. Provisional Patent Application Ser. No. 63/282,517 filed on Nov. 23, 2021, the disclosure of which are hereby incorporated by reference in their entirety for all purposes.

FIELD OF THE INVENTION

This invention relates generally to personal protective vests, and more specifically, to a body armor panel for use with a personal protective vest.

BACKGROUND OF THE INVENTION

At least some known personal protective vests include rigid ballistic panels that are sown into the vest to provide the wearer protection from small arms fire. These rigid ballistic panels to not allow for a freedom of movement that is desired by security personal to provide additional comfort and flexibility, while providing a high level of safety protection.

The present invention addresses one or more of the aforementioned challenges.

SUMMARY OF THE INVENTION

In different embodiments of the present invention, a personal protective vest and a body armor panel for use with the personal protective vest are provided.

In one embodiment of the present invention, a body armor panel for use with a personal protective vest is provided. The body armor panel includes an outer cover defining a panel assembly cavity and a ballistic material panel assembly positioned within the panel assembly cavity. The ballistic material panel assembly including a plurality of layered material segments defined between a strike face and a wear face, each of the layered material segments including a different ballistic material. The plurality of layered material segments includes a first layered material segment including a single layer of a first ballistic material defining the strike face. The first ballistic material includes an ultra-high molecular weight polyethylene fiber based composite laminate having an Areal density of about between 226 $g/m^2$ and 240 $g/m^2$.

In another embodiment of the present invention, a personal protective vest assembly is provided. The personal protective vest assembly includes an outer surface, an inner surface, and a ballistic panel pocket defined between the outer surface and the inner surface. The inner surface includes a slot for accessing the ballistic panel pocket. The body armor panel is removably positioned within the ballistic panel pocket and includes an outer cover defining a panel assembly cavity and a ballistic material panel assembly positioned within the panel assembly cavity. The ballistic material panel assembly including a plurality of layered material segments defined between a strike face and a wear face, each of the layered material segments including a different ballistic material. The plurality of layered material segments includes a first layered material segment including a single layer of a first ballistic material defining the strike face. The first ballistic material includes an ultra-high molecular weight polyethylene fiber based composite laminate having an Areal density of about between 226 $g/m^2$ and 240 $g/m^2$.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE INVENTION

Figure 1:
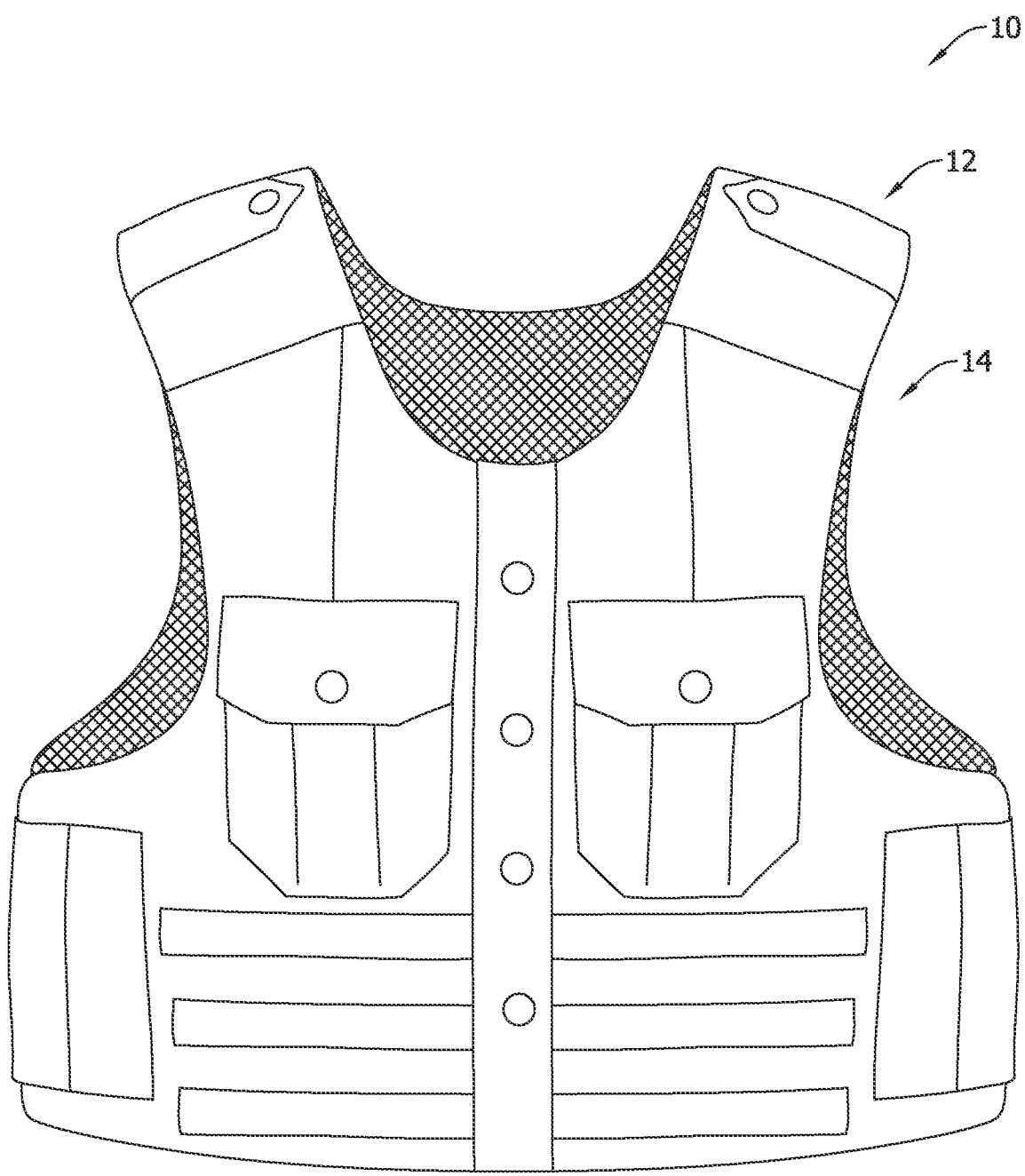
FIGS. 1-5 are perspective views of a personal protective vest assembly including a personal protective vest and body armor panels.
Figure 2:
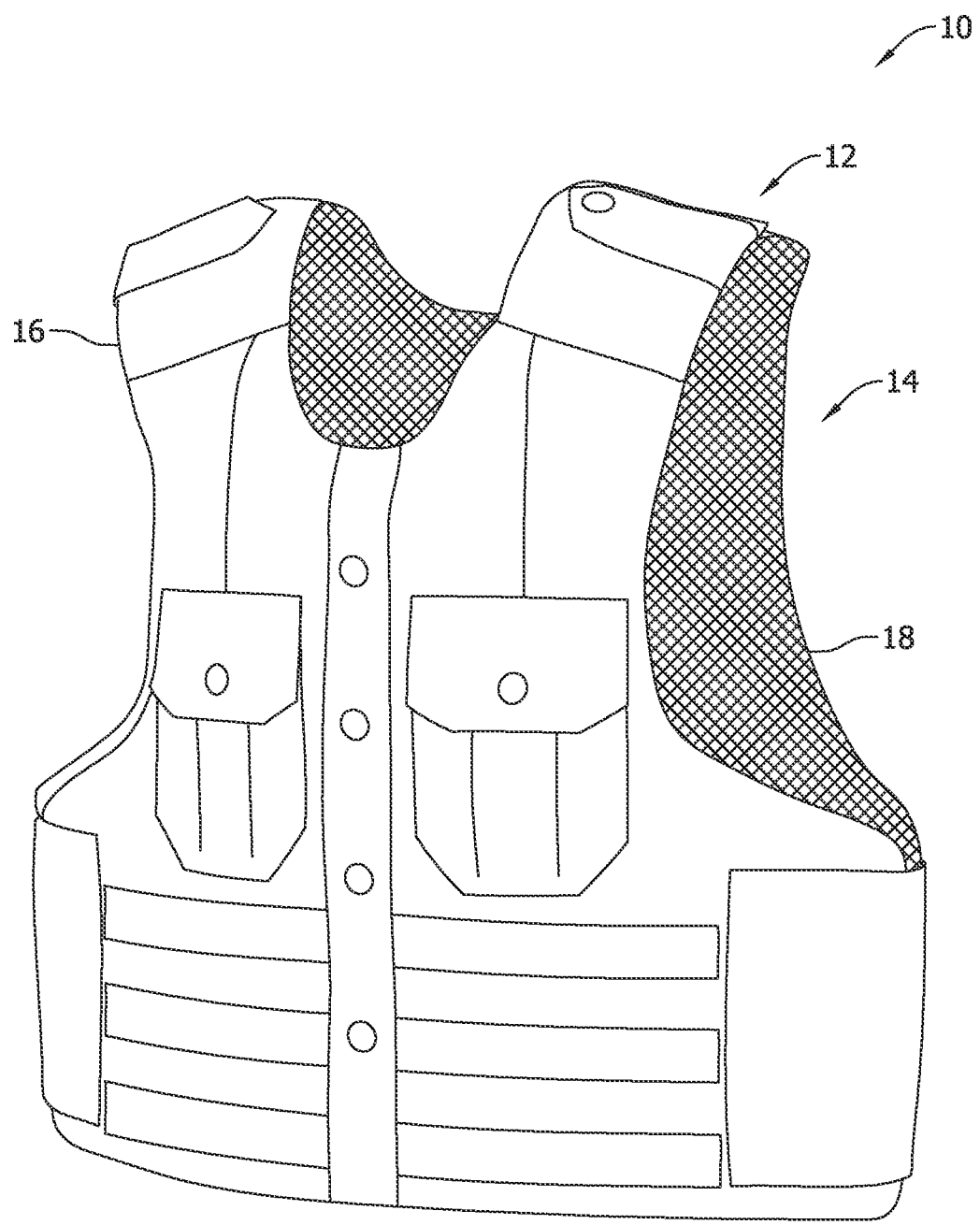
Figure 3:
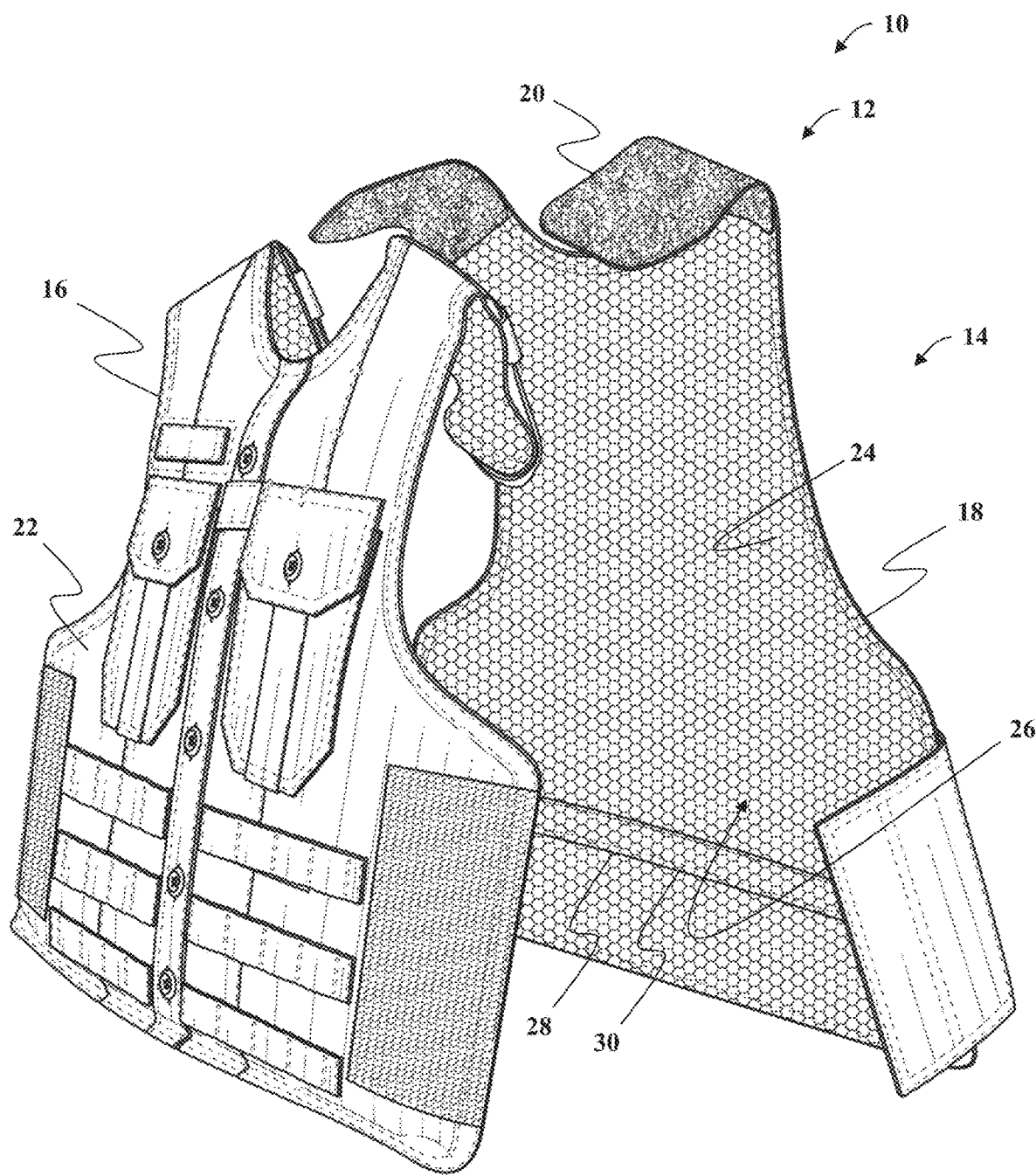
Figure 4:
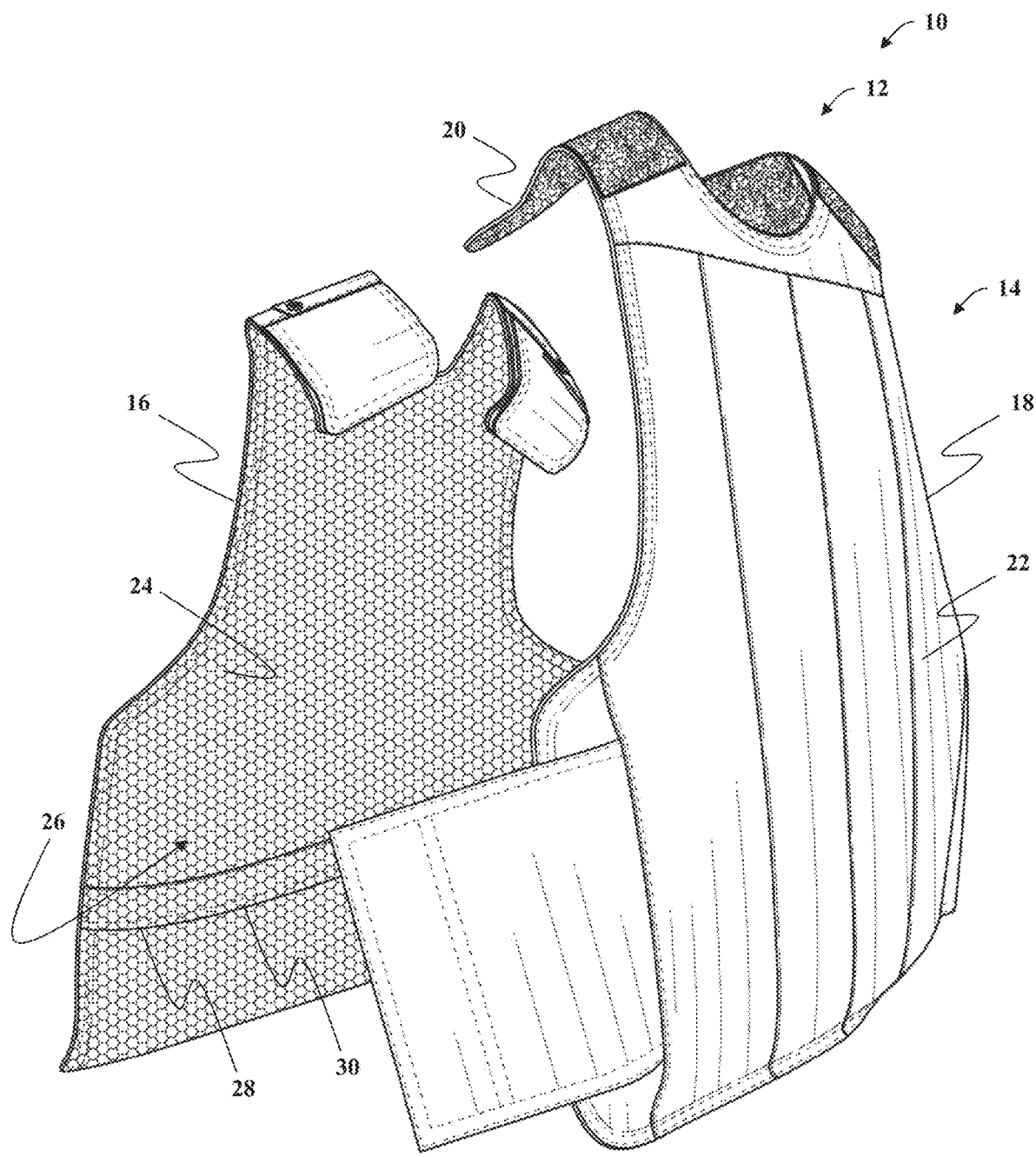
Figure 5:
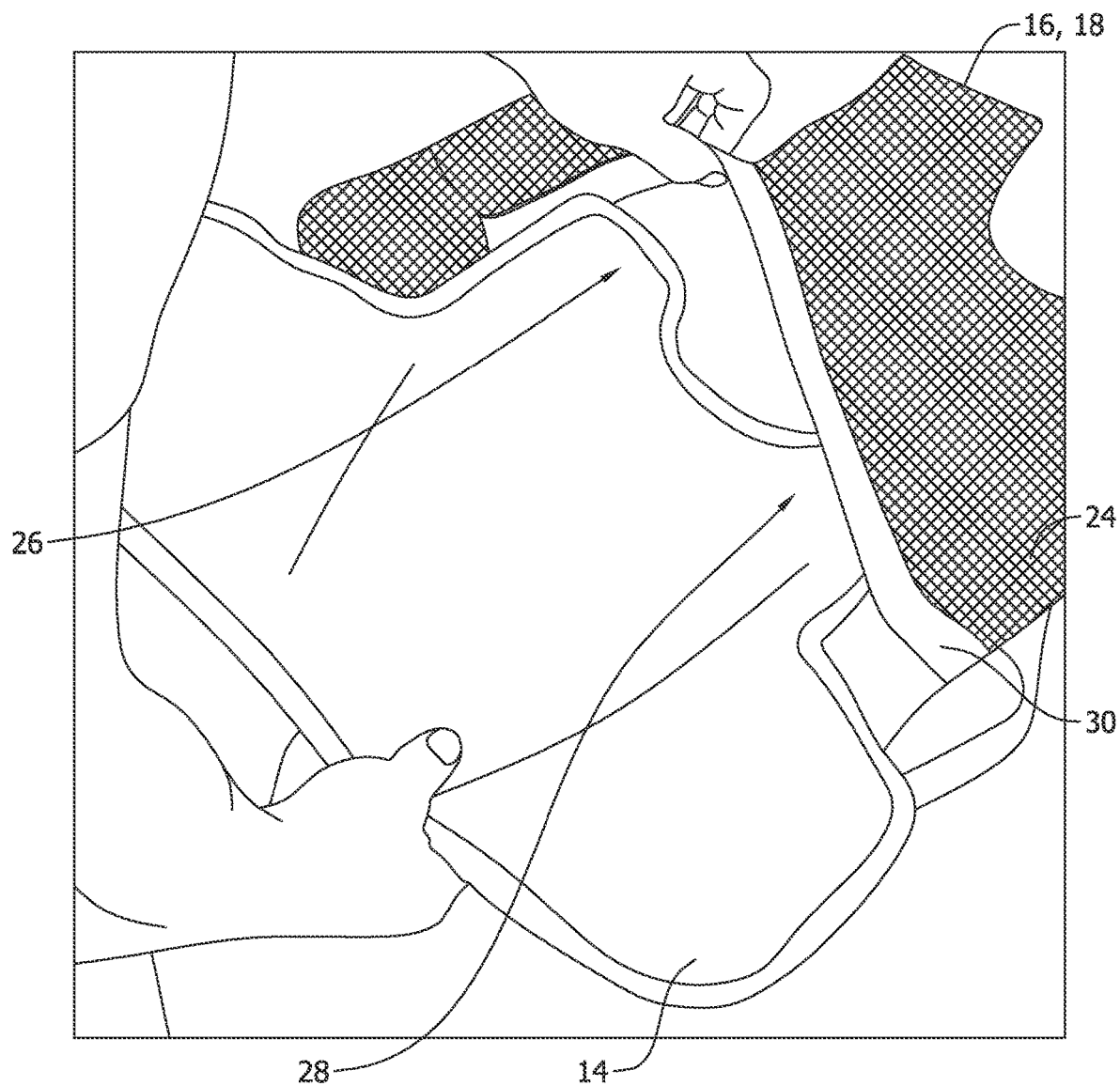

In the following description, numerous specific details are set forth in order to provide a thorough understanding of the present invention. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be apparent, however, to one having ordinary skill in the art that the specific detail need not be employed to practice the present invention. In other instances, well-known materials or methods have not been described in detail in order to avoid obscuring the present invention.

In general, the present invention describes a personal protective vest system that includes a soft-flexible armor panel that is inserted into a personal protective vest. In some embodiments, the personal protective vest system includes the Hyperline™ soft-flexible armor panel provided by Safe Life Defense™.

Referring to FIGS. 1-14, in the illustrated embodiment, the present invention includes a personal protective vest assembly 10 that includes a wearable personal protective vest 12 and one or more body armor panels 14 inserted into the personal protective vest 12. In some embodiments, the personal protective vest 12 is configured to be worn by a person covering a portion of the person's torso. In other embodiments, the personal protective vest assembly 10 may include other wearable protective articles that cover other areas of a person's body such as, for example, wearable protective articles covering the lower body, arms, legs, and head.

In the illustrated embodiment, the personal protective vest 12 includes a front vest panel 16 and a rear vest panel 18. In some embodiments, the front vest panel 16 may be removable coupled to the rear vest panel 18 with a vest fastening assembly 20. The vest fastening assembly 20 may include, for example, a Velcro assembly, a button assembly, and/or any suitable fasteners that allow the front vest panel 16 to removable attach to the rear vest panel 18.

Each vest panel 16, 18 includes an outer surface 22 and an inner surface 24 adapted to be positioned adjacent to the person's body with the personal protective vest 12 worn by the person. A ballistic panel pocket 26 is defined between the outer surface 22 and the inner surface 24. The ballistic panel pocket 26 is sized and shaped to receive a body armor panel 14 therein such that the body armor panel 14 is positioned within the ballistic panel pocket 26. The inner surface 24 also including a slot 28 defined along the inner surface 24 to provide access to the ballistic panel pocket 26 to insert and/or remove body armor panel 14. A slot fastening assembly 30 may be defined along the slot 28 to allow the ballistic panel pocket 26 to be selectively sealed. The slot fastening assembly 30 may include, for example, a Velcro assembly, a button fastener assembly, and/or any suitable fasteners that allow the slot 28 and ballistic panel pocket 26 to be sealed.

In the illustrated embodiment, the body armor panel 14 includes an outer cover 32 that defines a panel assembly cavity 34 and a ballistic material panel assembly 36 that is positioned within the panel assembly cavity 34. The outer cover 32 may include a 30 denier thermoplastic polyurethane laminated nylon fabric. In some embodiments, the body armor panel 14 includes a cross-sectional shape substantially similar to the cross-sectional shape of the corresponding vest panels 16, 18. In other embodiments, the body armor panel 14 may include any suitable cross-sectional shape to facilitate covering any portion of a person's body.

The ballistic material panel assembly 36 includes a plurality of layered material segments 38, 40, 42, 44 defined between a strike face 46 and a wear face 48, with each of the layered material segments 38, 40, 42, 44 including a different ballistic material. When positioned within the ballistic panel pocket 26 the strike face 46 is orientated near the outer surface 22 of the corresponding vest panel 16, 18 and the wear face 48 is orientated near the inner surface 24 of the corresponding vest panel 16, 18 such that the wear face 48 is closer to a person's body than the strike face 46 with the personal protective vest 12 worn by the person.

In the illustrated embodiment, the plurality of layered material segments includes a first layered material segment 38 that includes a layer of a first ballistic material 50, a second layered material segment 40 that is adjacent the first layered material segment 38 and includes a plurality of layers of a second ballistic material 52, a third layered material segment 42 that is adjacent the second layered material segment 40 and includes a plurality of layers of a third ballistic material 54, and a fourth layered material segment 44 that is adjacent the third layered material segment 42 and includes a plurality of layers of a fourth ballistic material 56. The first layered material segment 38 defines the strike face 46 and the fourth layered material segment 44 defines the wear face 48. A number of layers of the third ballistic material 54 is greater than a number of layers of the second ballistic material 52, and a number of layers of the fourth ballistic material 56 is less than the number of layers of the third ballistic material 54.

Figure 10:
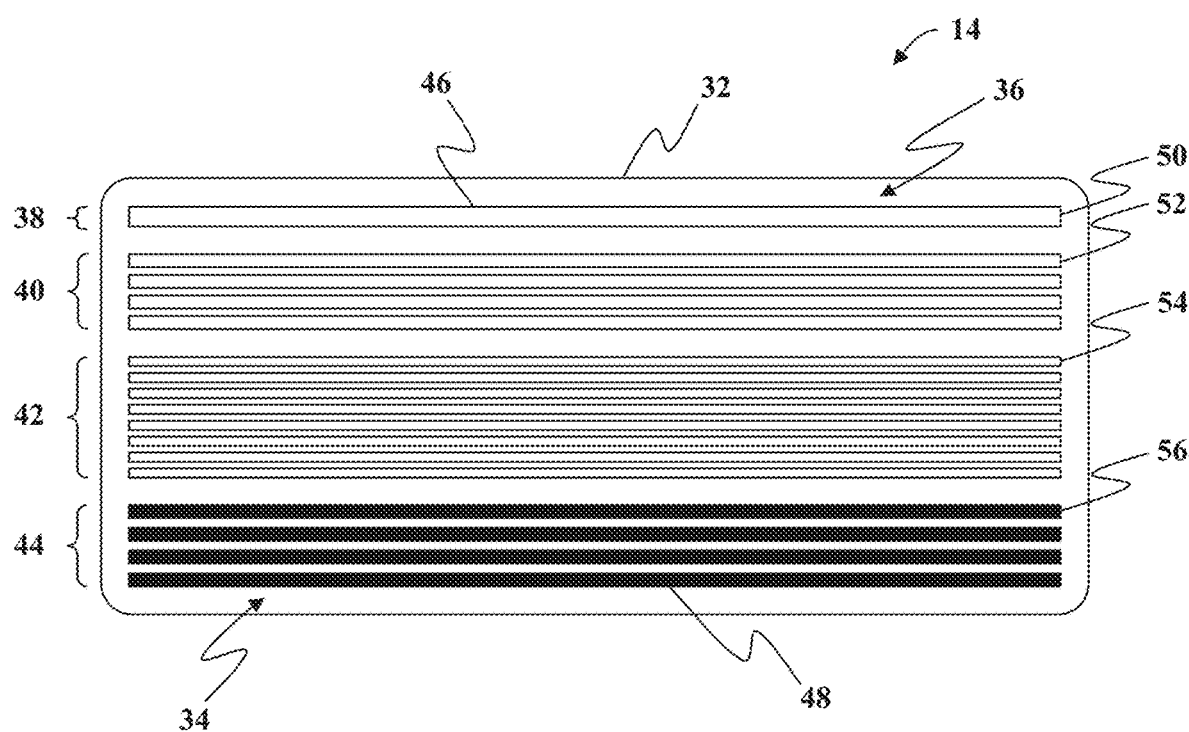
FIGS. 10 and 11 are schematic cross-sectional views of the body armor panel shown in FIGS. 6-9.

In some embodiments, as shown in FIG. 10, the first layered material segment 38 includes a single layer of the first ballistic material 50, the second layered material segment 40 includes four layers of the second ballistic material 52, the third layered material segment 42 includes eight layers of the third ballistic material 54, and the fourth layered material segment 44 includes four layers of the fourth ballistic material 56. In other embodiments, each segment 38, 40, 42, 44 may include any suitable number of layers of corresponding ballistic material.

The first ballistic material 50 includes an ultra-high molecular weight polyethylene fiber based composite laminate having an Areal density of about between 226 g/m$^2$ and 240 g/m$^2$ including four single layers of unidirectional sheet cross plied at 90 degrees to each other and consolidated with a rubber based matrix. In some embodiments, the first ballistic material may include DSM Dyneema® HB50 with the first layered material segment 38 includes a single layer of DSM Dyneema® HB50.

The second ballistic material 52 includes an ultra-high molecular weight polyethylene fiber based composite laminate having an Areal density of about between 208 g/m$^2$ and 224 g/m$^2$ including six single layers of unidirectional sheet cross plied at 90 degrees to each other and consolidated with a rubber based matrix. In some embodiments, the second ballistic material may include DSM Dyneema® SB117 with the second layered material segment 40 including four layers of DSM Dyneema® SB117.

The third ballistic material 54 includes para-aramid unidirectional material including four plies of para-aramid unidirectional material cross-plied in 0°/90°/0°/90° configuration. In some embodiments, the third ballistic material 54 may include Barrday Advanced Material Solutions™ U611 with the third layered material segment 42 including eight layers of Barrday Advanced Material Solutions™ U611.

The fourth ballistic material 56 includes a woven and laminated material having an Areal density of about 516 g/m$^2$. In some embodiments, the fourth ballistic material 56 may include Barrday Advanced Material Solutions™ FCKER1017160-01129 with the fourth layered material segment 44 including four layers of Barrday Advanced Material Solutions™ FCKER1017160-01129.

Figure 11:
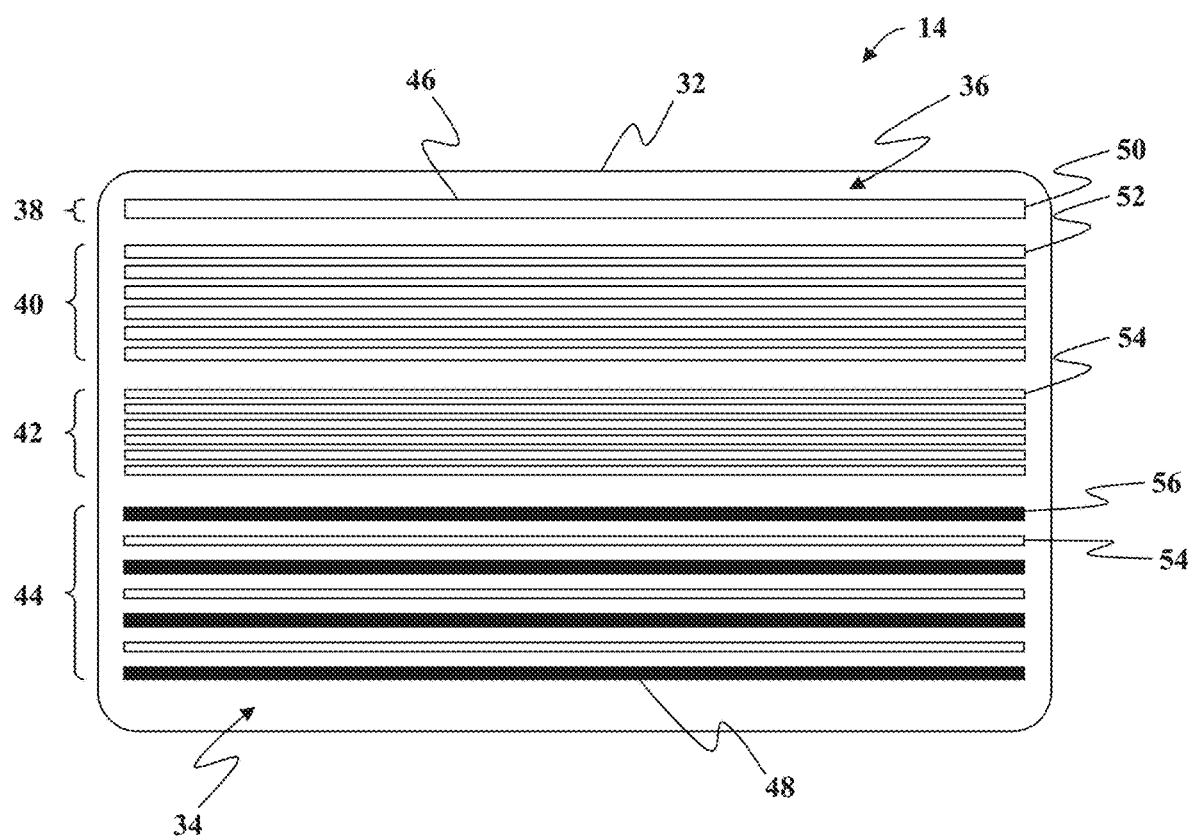
Figure 12:
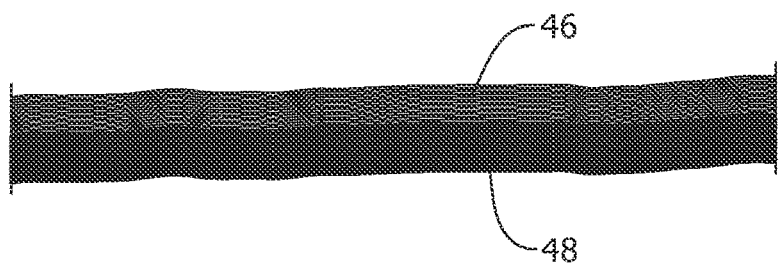
FIG. 12 is a cross-sectional view of the body armor panel shown in FIG. 10.
Figure 13:
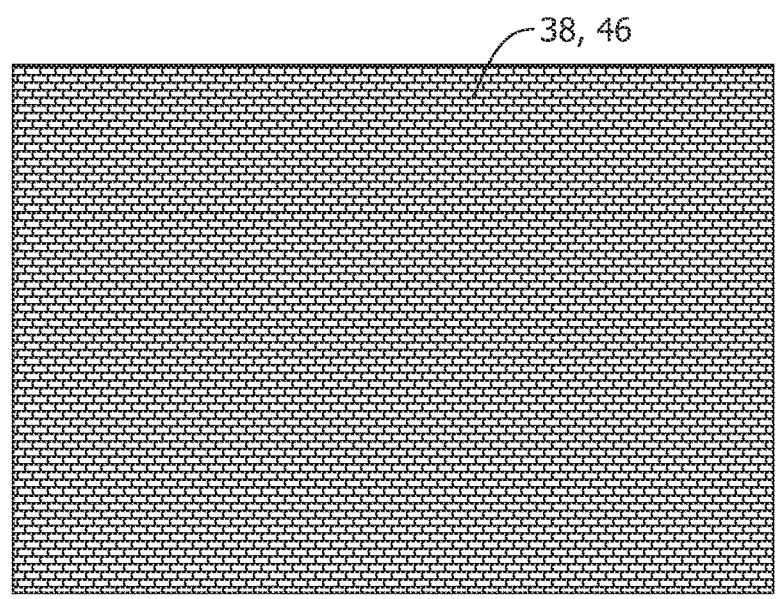
FIG. 13 is a partial view of a strike face of the body armor panel shown in FIG. 10.
Figure 14:
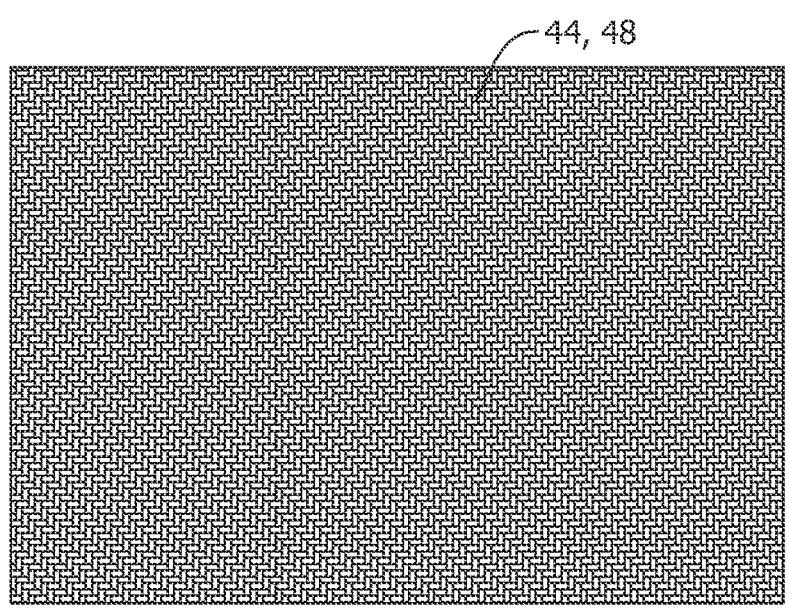
FIG. 14 is a partial view of a wear face of the body armor panel shown in FIG. 10.

As shown in FIG. 11, in some embodiments, the plurality of layered material segments includes the first layered material segment 38 including a single layer of the first ballistic material 50, the second layered material segment 40 including six layers of the second ballistic material 52, the third layered material segment 42 including six layers of the third ballistic material 54, and the fourth layered material segment 44 including a plurality of layers of the third ballistic material 54 and a plurality of layers of the fourth ballistic material 56 positioned in an alternating layered arrangement such that each layer of the third ballistic material 54 is positioned between corresponding layers of the fourth ballistic material 56. For example, the fourth layered material segment 44 may include four layers of the fourth ballistic material 56 interlaced with three layers of the third ballistic material 54 such that a top layer of fourth ballistic material 56 is adjacent a bottom layer of third ballistic material 54 of the third layered material segment 42, and a bottom layer of fourth ballistic material 56 defines the wear face 48.

Figure 6:
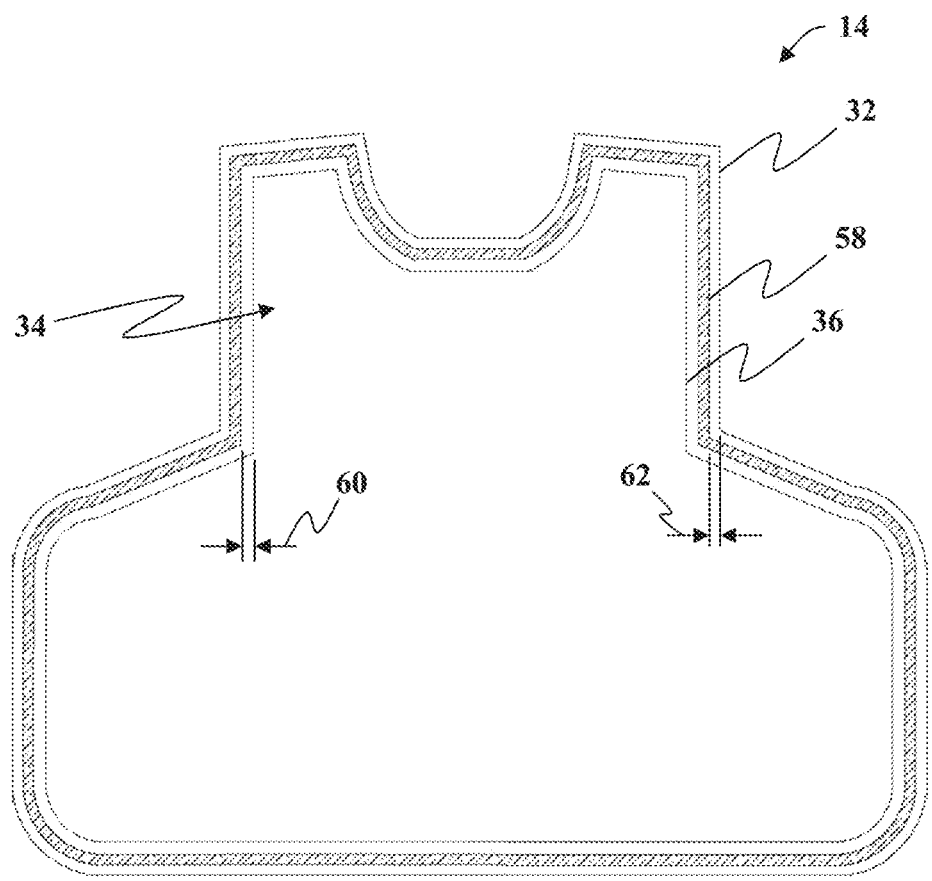
FIGS. 6-9 are schematic views of a body armor panel that may be used with the personal protective vest assembly shown in FIG. 1.
Figure 7:
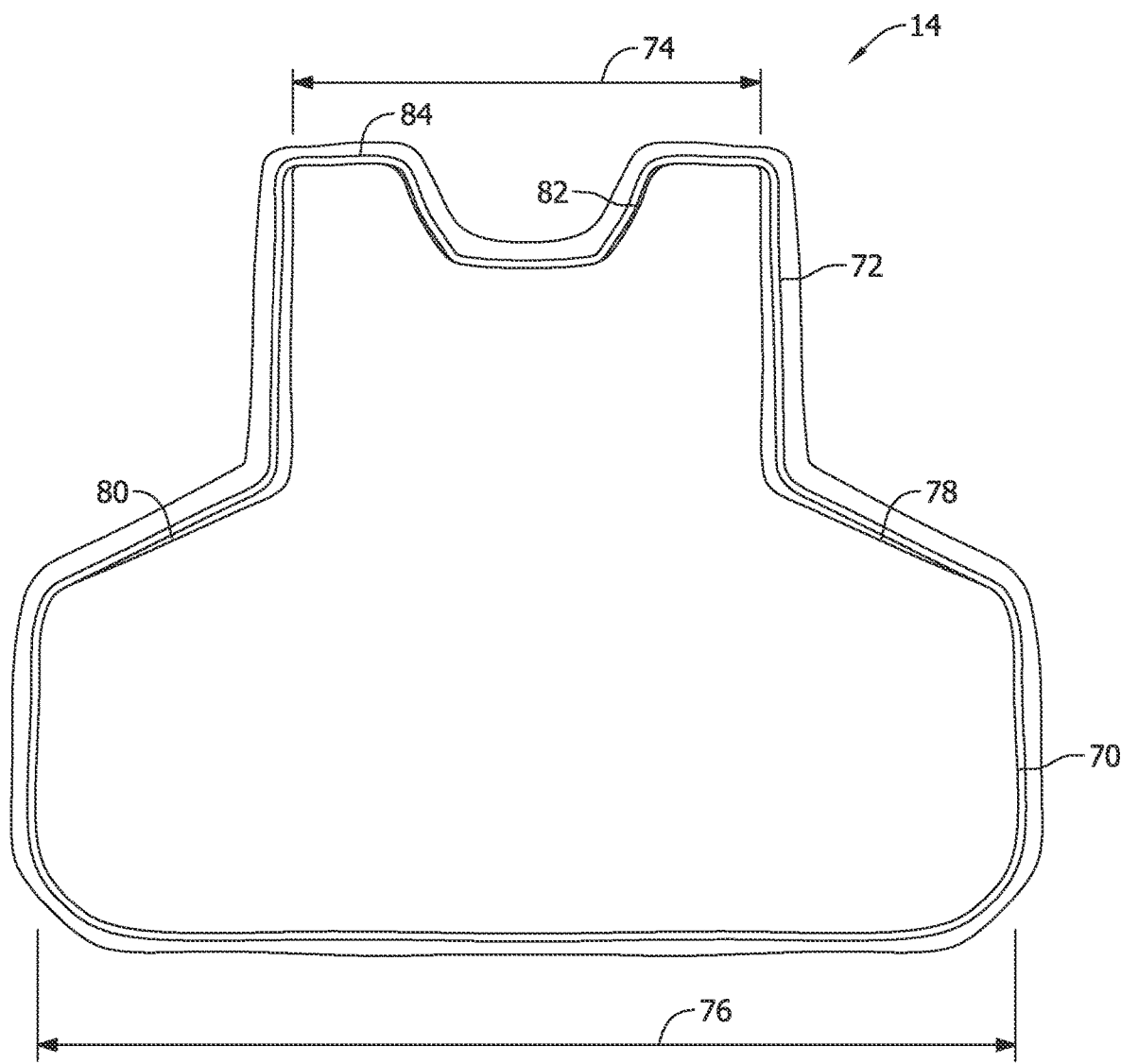
Figure 8:
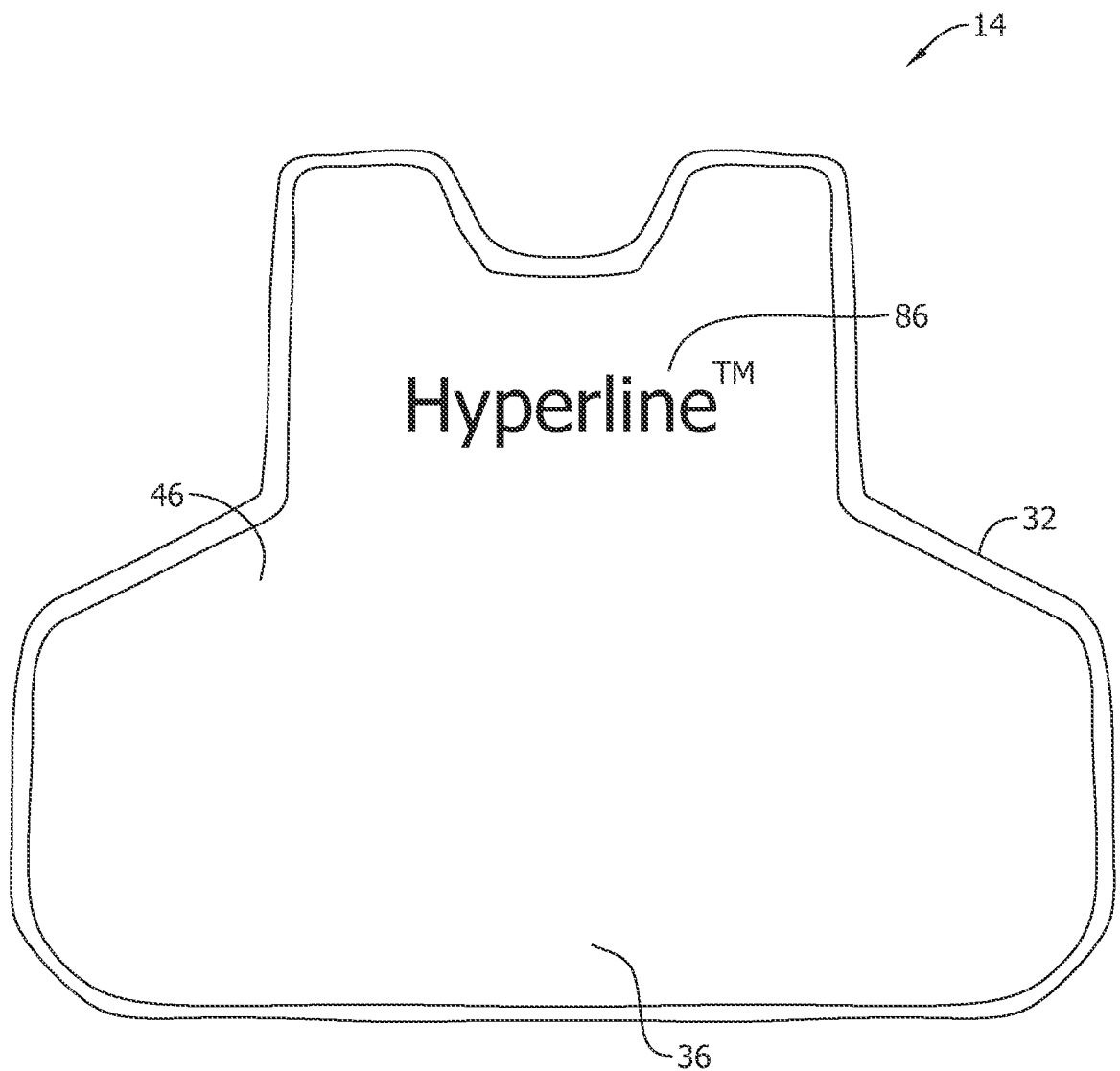
Figure 9:
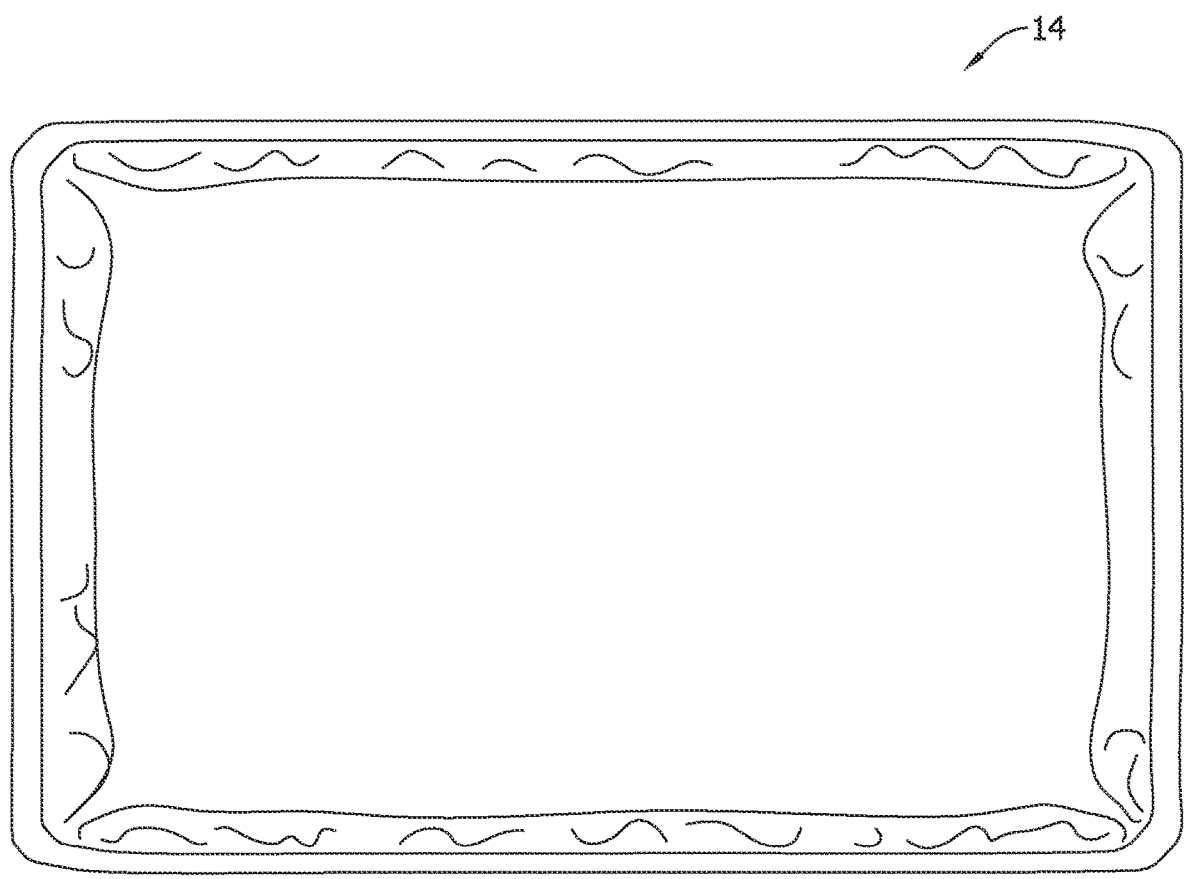

In some embodiments, as shown in FIGS. 6-8, the body armor panel 14 includes a cross-sectional shape defining a lower portion 70 and an upper portion 72 extending from the lower portion 70. The upper portion 72 has a first width 74, and the lower portion 70 has a second width 76 that is larger than the first width 74 of the upper portion 72. The body armor panel 14 also has a pair of opposing side walls 78, 80 that extend from the lower portion 70 to the upper portion 72 at opposing oblique angles. The upper portion 72 also includes an arcuate surface 82 defined along the a top edge 84 of the upper portion 72. In other embodiments, as shown in FIG. 9, the body armor panel 14 may include a substantially rectangular cross-sectional shape.

Figure 15:
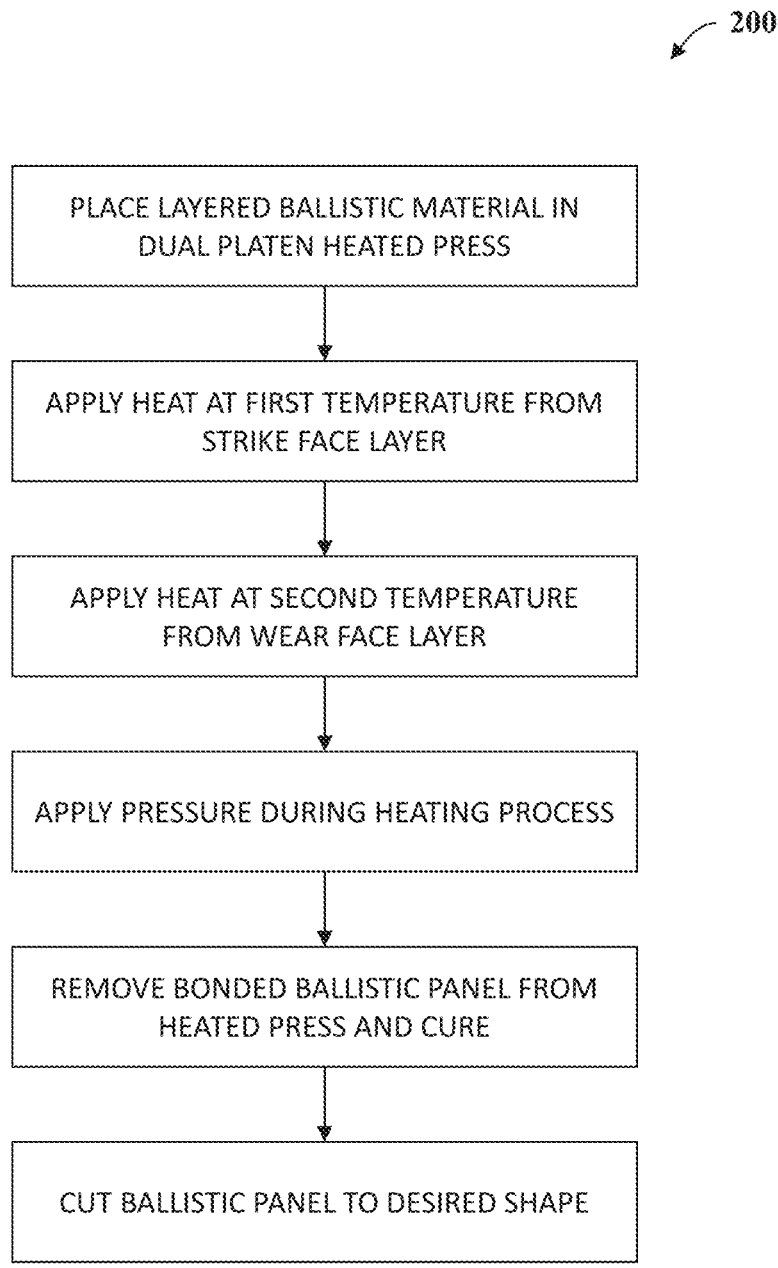
FIGS. 15 and 16 are flowcharts illustrating a method of manufacturing the body armor panel.

FIG. 15 is a flowchart illustrating a method 200 of manufacturing the body armor panel 14. The method includes a plurality of steps. Each method step may be performed independently of, or in combination with, other method steps. In the illustrated embodiment, the method 200 includes positioning the ballistic material panel assembly 36 within a dual platen heated press including placing the layered material segments 38, 40, 42, 44 within the dual platen heated press such that the first layered material segment 38 defines the strike face 46, the second layered material segment 40 is between the first layered material segment 38 and the third layered material segment 42, and the fourth layered material segment 44 is adjacent the third layered material segment 42 and defines the wear face 48.

The dual platen heated press is then operated to apply a heat process to the ballistic material panel assembly 36 including applying heat at a first temperature from the strike face 46, applying heat at a different second temperature from the wear face 48, and applying pressure to the ballistic material panel assembly 36 during the heat process. In some embodiments, the first temperature is between about 250 and 300° Fahrenheit and the second temperature is between about 150 and 225° Fahrenheit, with the applied pressure at about 80 psi.

The ballistic material panel assembly 36 is then removed from the dual platen heated press after a first predefined elapsed period of time. For example, in some embodiments, the first predefined elapsed period of time is about 1.5 minutes. The ballistic material panel assembly 36 is allowed to cool for a second elapsed period of time and then cut to a desired shaped. In some embodiments, the second predefined elapsed period of time is about 30 seconds.

In some embodiments, the Hyperline™ soft armor panel is constructed by layering ballistic material in a 0°/0° orientation in a layered material configuration from strike face to wear face including: 1 Layer—DSM Dyneema® HB50; 4 Layers—DSM Dyneema® SB117; 8 Layers—Barrday Advanced Material Solutions™ U611; and 4 Layers—Barrday Advanced Material Solutions™ FCKER1017160-01129. The layered materials are feed into a dual platen heated press that is used to apply heat at a temperature of 250-300 degrees Fahrenheit from the strike face layer. A temperature of 150-225 degrees Fahrenheit is applied from the opposite platen to the wear face layer. Pressure is applied during the heat process at no less than 80 psi. After a minimum of 1.5 minutes the press is released and the materials is removed from the machinery and is allowed to cure for a period of no less than 30 seconds. The armor packet may be consolidated in a full sheet from which shapes may be cut by using a multi ply cutter, precision rotary blade or die cutter, or, layers may be pre-cut into uniform shapes that are layered and consolidated using the above process.

The ballistic material panel assembly 36 is sealed inside an outer cover 32 including water resistant TPU material such as, for example, Brookwood™ Cover HST 30d. The TPU is sealed using a High Frequency Ultrasonic Welding Machine. In some embodiments, the body armor panel 14 includes a High Frequency Weld (HFW) seal 58 about the perimeter of the ballistic material panel assembly 36 having a width of about 0.25 inches +/−0.25 inches, with a maximum gap 60 between the ballistic panel 36 and the HFW seal 58 of about 0.25 inches +−0.2 inches, with an overcut 62 having a maximum allowable width equal to 0.5 inches. A thermal label with an adhesive backing is then applied to the wear face of the sealed ballistic panel.

Figure 16:
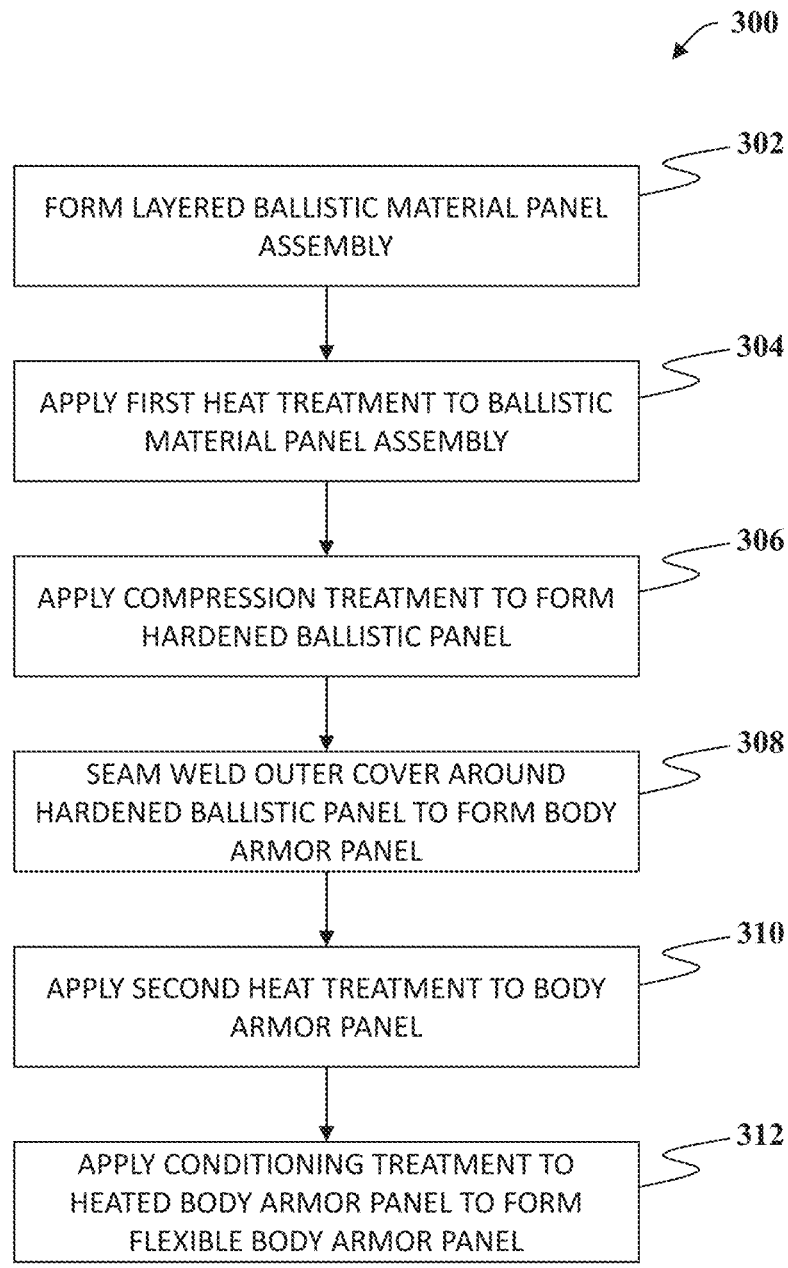
Figure 17:
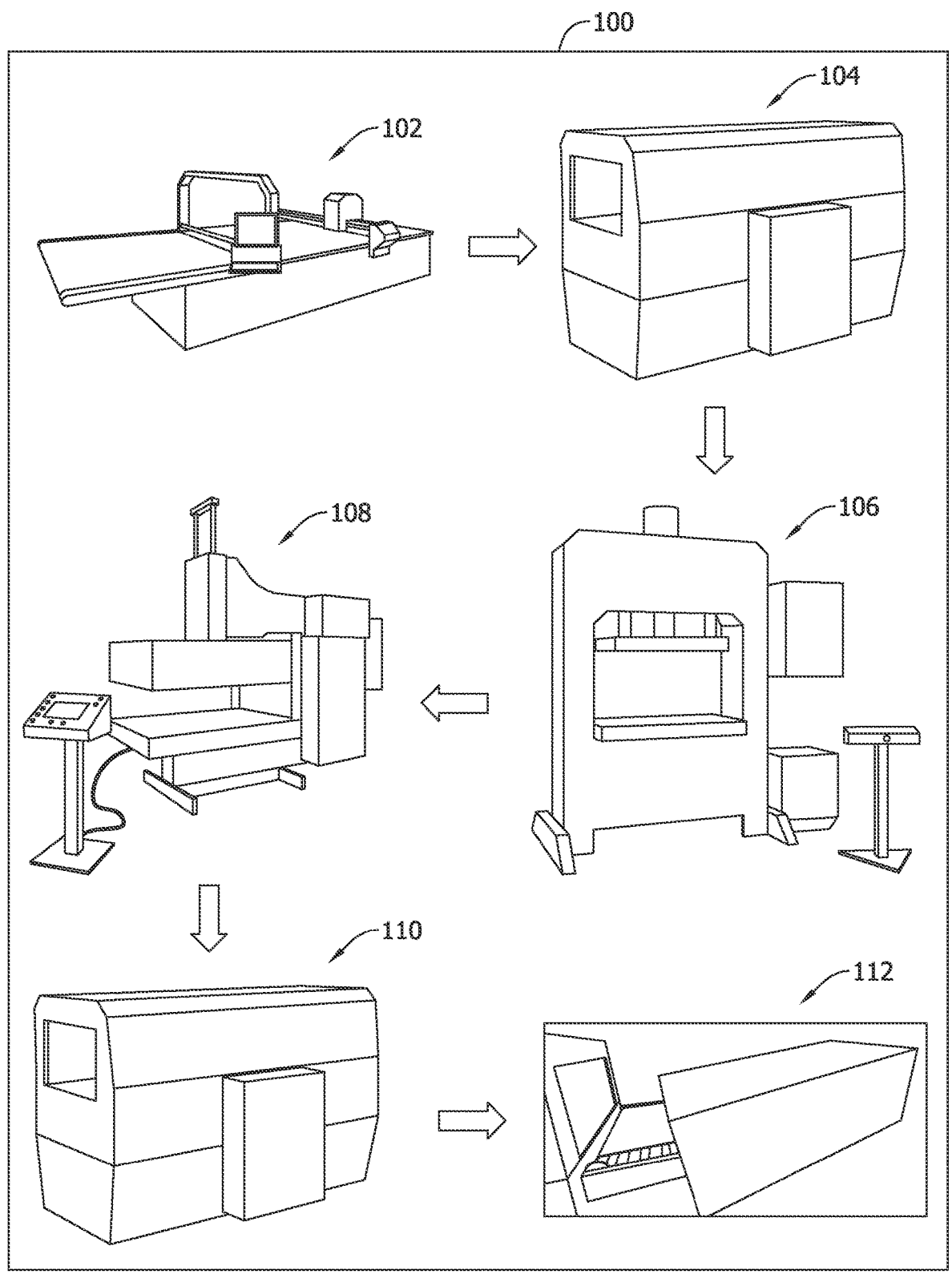
FIG. 17 is a schematic view of a system used to manufacture the body armor panel.
Figure 18:
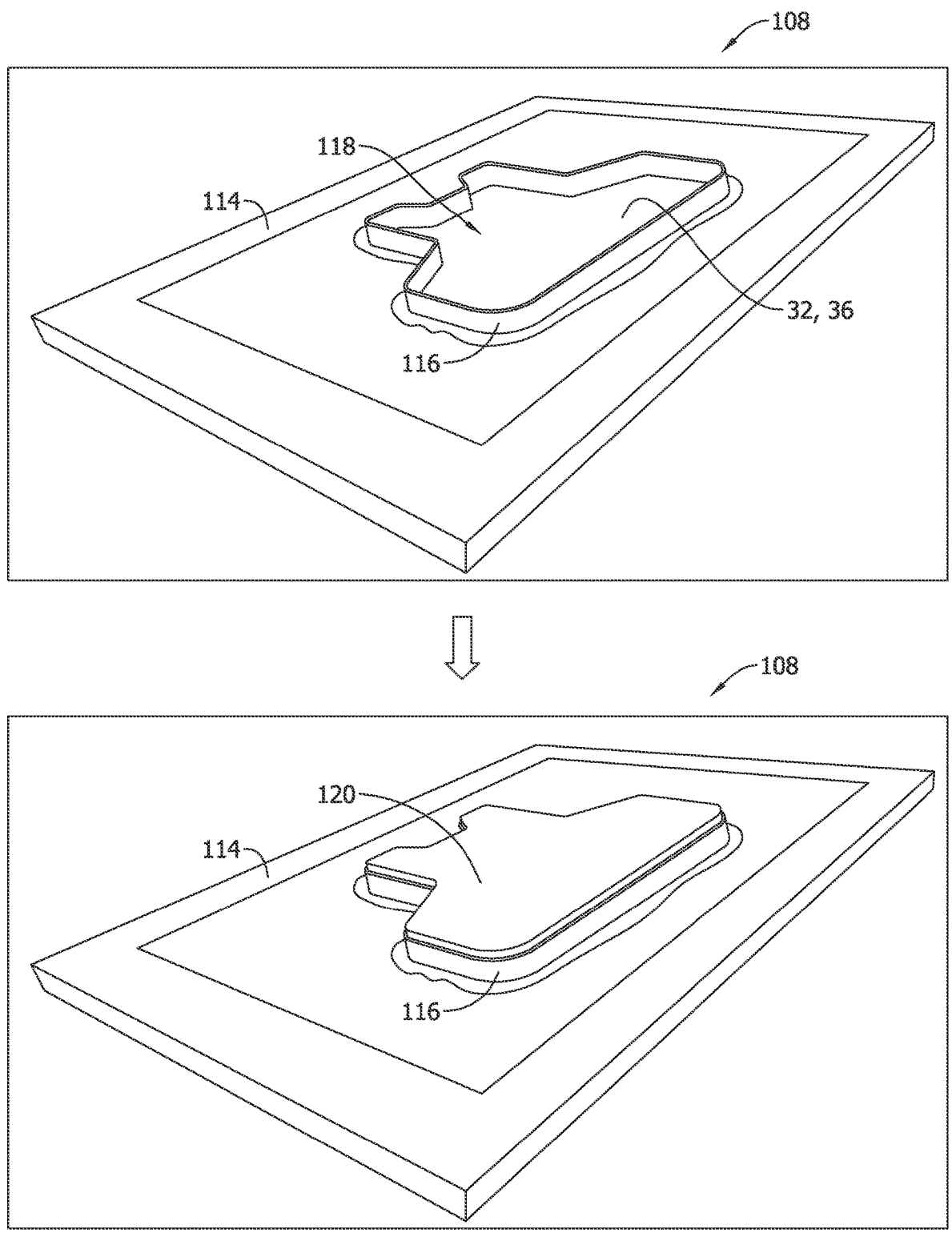
FIGS. 18-21 are schematic views of a brass mold and ballistic material panel assembly used to form the body armor panel.
Figure 19:
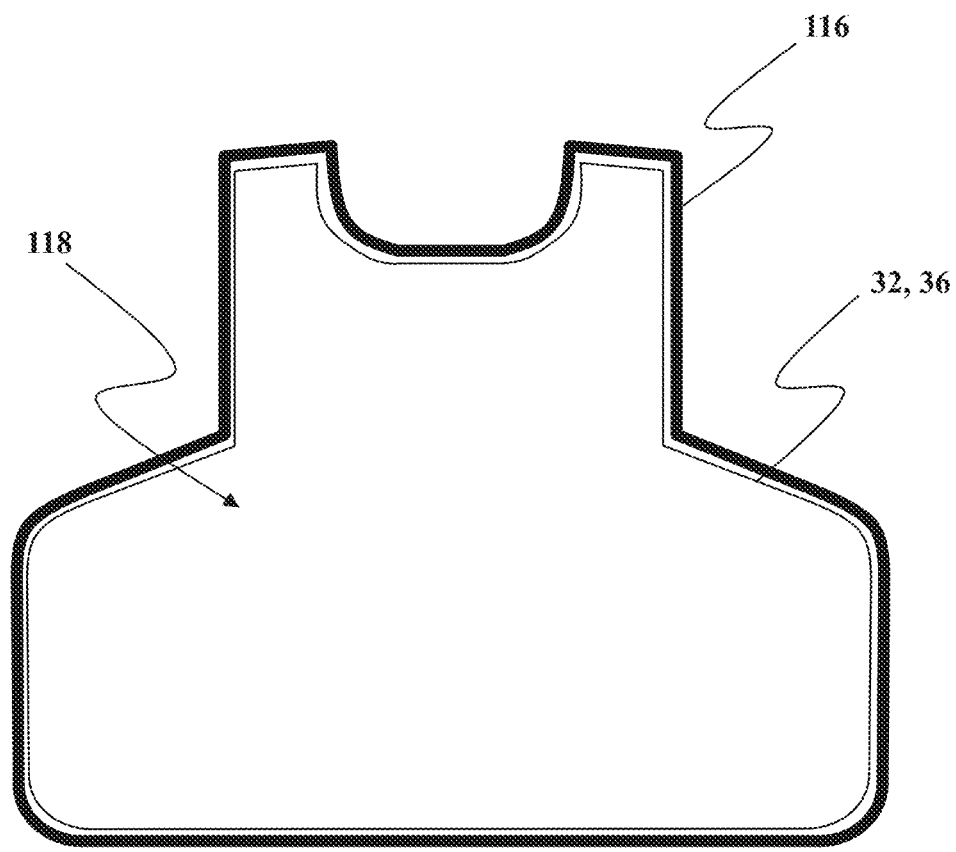
Figure 20:
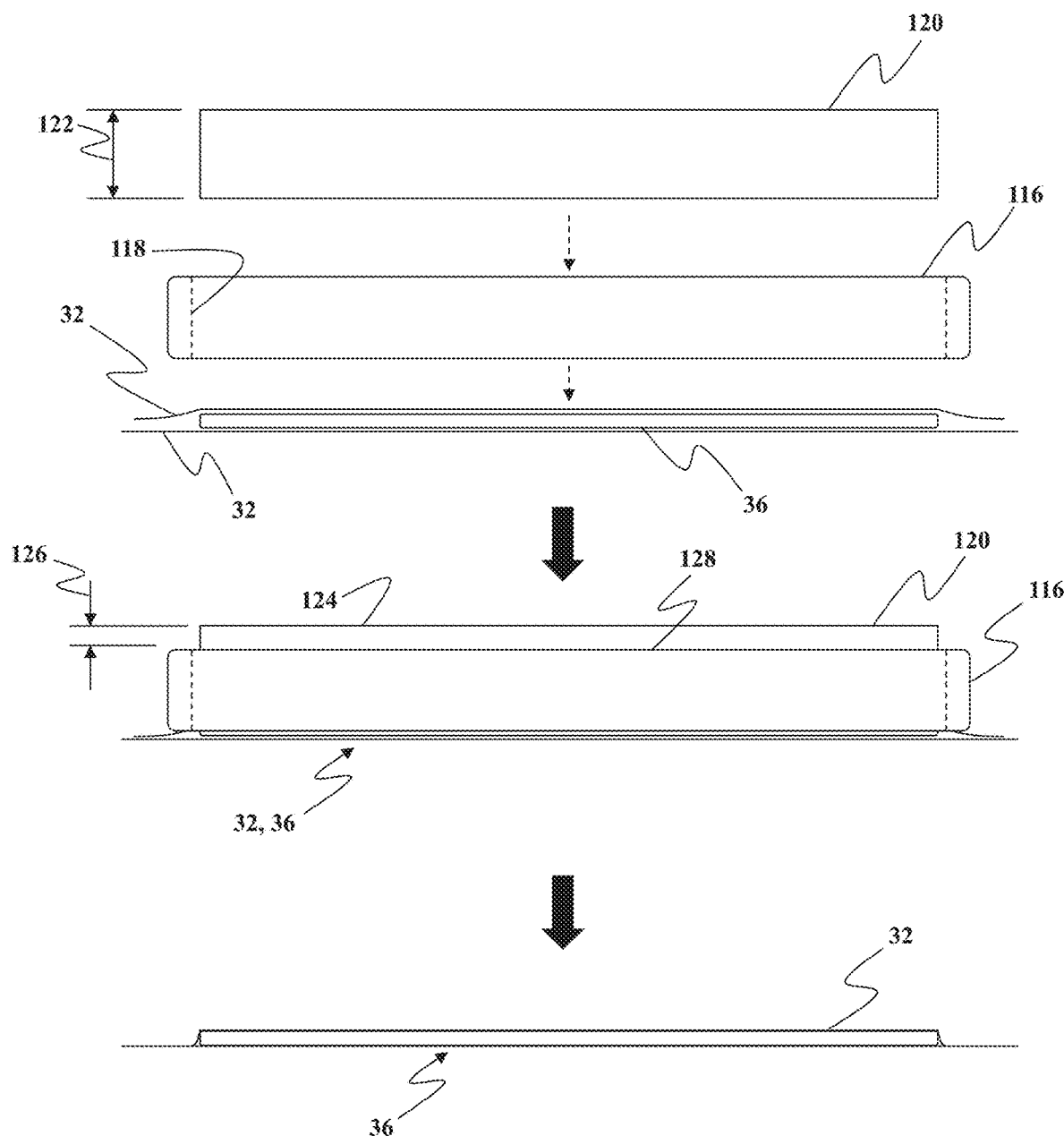

FIG. 16 is a flowchart illustrating another method 300 of manufacturing the body armor panel 14. FIG. 17 is a schematic view of a system 100 used to manufacture the body armor panel 14. In the illustrated embodiment, the system 100 includes a fabric spreading and cutting machine 102, a first industrial conveyor oven machine 104, a hydraulic press machine 106, a high frequency ultrasonic welding machine 108, a second industrial conveyor oven machine 110, and a belt press machine 112. In method step 302, the plurality of layered material segments are fed through the fabric spreading and cutting machine 102 and cut to predefined cross-sectional shapes to form a pre-cut, layered ballistic material panel assemblies 36.

In method step 304, a first heat treatment is applied to a pre-cut, layered ballistic material panel assembly 36 to increase a temperature of the ballistic material panel assembly to a predefined temperature. The first heat treatment may be applied to increase the temperature of the ballistic material panel assembly to the predefined temperature between about 150° and 190° Fahrenheit. For example, the pre-cut, layered ballistic material panel assembly 36 may be positioned within an industrial heat tunnel, i.e., the first industrial conveyor oven machine 104, for a predefined period of time to increase the temperature of the ballistic material panel assembly to the predefined temperature between about 150° and 190° Fahrenheit. In some embodiments, applying the first heat treatment includes operating the industrial heat tunnel at an internal temperature between about 300° and 350° Fahrenheit, and positioning the ballistic material panel assembly within the heat tunnel for an elapsed heating time between about 1 minute and 2 minutes. For example, the first heat treatment may include feeding the pre-cut, layered ballistic material panel assembly 36 through the first industrial conveyor oven machine 104 operated with a heated environment of about 335° F. for 1 minute and 50 seconds. In some embodiments, a reflective adhesive vinyl sticker 86 is applied onto a top layer (i.e., the strike face 46) of the ballistic material panel assembly 36 prior to the first heat treatment.

In method step 306, a compression treatment is applied to the heated ballistic material panel assembly at a predefined pressure and a predefined period of time to form a hardened ballistic material panel assembly. For example, upon completion of the first heat treatment, the heated ballistic material panel assembly is removed from the first industrial conveyor oven machine 104 and positioned onto the hydraulic press machine 106. The hydraulic press machine 106 is then operated to apply the compression treatment including applying a pressure between about 100 to 500 tons to the heated ballistic material panel assembly. The compression treatment may include, for example, applying a pressure between about 100 to 500 tons to the heated ballistic material panel assembly for a period of 30 seconds. In some embodiments, the compression treatment may include applying 200 tons of pressure to the heated ballistic material panel assembly for a period of 30 seconds to form a hardened ballistic material panel assembly.

In embodiments in which the reflective adhesive vinyl sticker 86 has been applied onto the strike face 46 of the ballistic material panel assembly 36 prior to the first heat treatment, the compression treatment embeds the reflective adhesive vinyl sticker 86 into the strike face 46 such that surface of reflective adhesive vinyl sticker 86 is substantially flush with the strike face 46 of the hardened ballistic material panel assembly.

Figure 21:
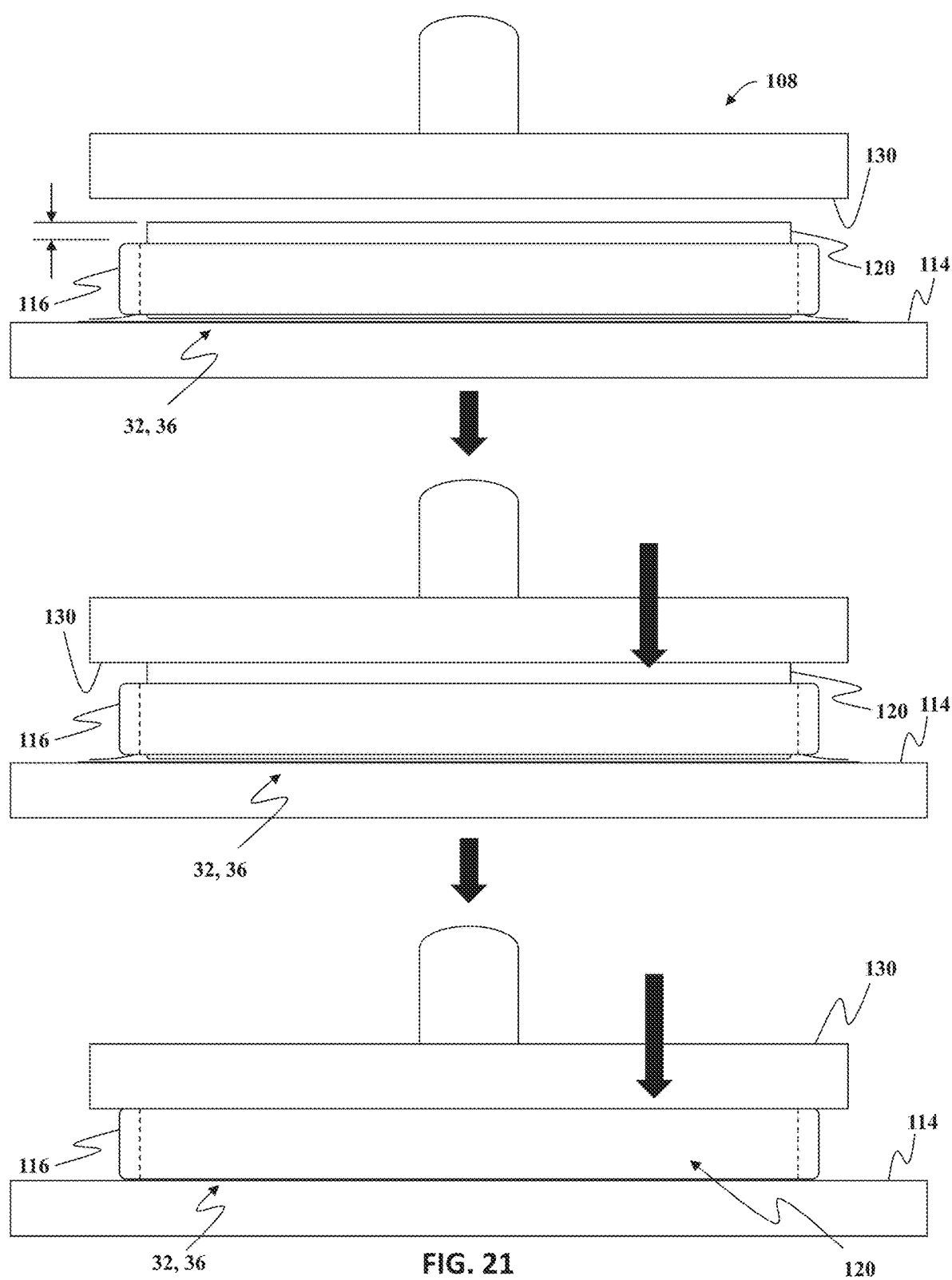

In method step 308, the hardened ballistic material panel assembly 36 is positioned within the outer cover 32 and the outer cover 32 is welded to form a perimeter seam about a perimeter of the hardened ballistic material panel assembly to seal the hardened ballistic material panel assembly within the outer cover to form a body armor panel 14. For example, as shown in FIGS. 16-21, the upon completing the compression treatment, the hardened ballistic material panel assembly 36 may be positioned between two layers of pre-cut outer cover material (e.g., Brookwood™ Cover HST 30d) having a cross-sectional shape substantially similar to the hardened ballistic material panel assembly 36, and placed on a bottom plate 114 of the high frequency ultrasonic welding machine 108. A brass mold assembly 116 having cross-sectional shape substantially similar to the hardened ballistic material panel assembly 36 is positioned over a top layer of the pre-cut outer cover material such that the hardened ballistic material panel assembly 36 is positioned within a cavity 118 defined through the brass mold assembly 116. A compressible insert 120 is then placed within the cavity 118 on top of the hardened ballistic material panel assembly 36 and outer cover 32. The compressible insert 120 includes a thickness 122 such that a top surface 124 of the compressible insert 120 is spaced a vertical distance 126 above an upper surface 128 of the brass mold assembly 116 with the compressible insert 120 contacting the outer cover 32. As shown in FIG. 21, as a top plate 130 of the high frequency ultrasonic welding machine 108 is moved to contact the brass mold assembly 116, the top plate 130 contacts the compressible insert 120 to cause the compressible insert 120 to compress and apply pressure onto the hardened ballistic material panel assembly 36 and outer cover 32 to force air trapped between the hardened ballistic material panel assembly 36 and outer cover 32 towards the perimeter of the outer cover 32 before the top plate 130 contacts the brass mold assembly 116. Once the top plate 130 is in contact with the brass mold assembly 116, the high frequency ultrasonic welding machine 108 is operated to weld a perimeter seam along the outer cover 32 via the brass mold assembly 116 to form a vacuum seal between the hardened ballistic material panel assembly 36 and the outer cover 32.

In some embodiments, the high frequency ultrasonic welding machine 108 is operated to seal the hardened ballistic material panel assembly 36 within a water resistance thermo-plastic packaging. The water resistance thermo-plastic packaging may include a semi-transparent thermo-plastic material such that the reflective adhesive vinyl sticker 86 is visible through the water resistance thermo-plastic outer cover. In some embodiments, the compressible insert 120 includes a Nomex® material positioned within the brass mold assembly 116. As the high frequency ultrasonic welding machine 108 operates the top plate 130 to lower and contact the brass mold assembly 116, the top plate 130 contacts the Nomex insert to apply pressure to the top layer of water-resistance material to remove air between top/bottom layers of material and the hardened ballistic material panel assembly 36 to facilitate eliminating air from the body armor panel 14. The high frequency ultrasonic welding machine 108 then applies high frequency radio waves to water resistance material layers through brass mold assembly to form the perimeter weld to seal the hardened ballistic material panel assembly 36 within the water resistant outer cover packaging and form an air-tight seal. The air-tight seal facilitates maintaining the shape of the assembled panel.

In another embodiment, the first heat treatment and the compression treatment are applied to only a portion of the plurality of the plurality of layered material segments 38, 40, 42, 44. For example, in some embodiments, the first heat treatment and the compression treatment are applied only to the first and second layered material segments 38, 40 to form a partially hardened ballistic material panel assembly. The partially hardened ballistic material panel assembly is then layered onto the third layered material segment 42 and/or the fourth layered material segment 44 to form the completed ballistic material panel assembly, which is then placed within the outer cover 32 and into the high frequency ultrasonic welding machine 108 to weld the perimeter seam about the completed ballistic material panel assembly.

In other embodiments, the first heat treatment and the compression treatment are applied only to the third layered material segment 42 and/or the fourth layered material segment 44 to form the partially hardened ballistic material panel assembly. The first and second layered material segments 38, 40 are then layered on top of the partially hardened ballistic material panel assembly to form the completed ballistic material panel assembly prior to welding the outer cover 32 onto the completed ballistic material panel assembly.

In method step 310, a second heat treatment is applied to the body armor panel 14 to increase a temperature of the body armor panel 14 to a second predefined temperate. For example, after the hardened ballistic material panel assembly 36 has been welded within the outer cover 32 to form the sealed body armor panel 14, the sealed body armor panel 14 is then placed into the second industrial conveyor oven machine 110 for a predefined period of time to increase the temperature of the sealed body armor panel 14 to facilitate increasing a flexibility of the sealed body armor panel 14. The second industrial conveyor oven machine 110 is operated at a lower internal temperature then the first industrial conveyor oven machine 104.

In method step 312, a conditioning treatment is then applied to the heated body armor panel 14 to increase a flexibility of a conditioned body armor panel 14. For example, after the second heat treatment is completed, the heated body armor panel 14 is fed through a belt press machine 112 that includes a pair of opposing conveyor belt systems that form roller pairs of varying heights. As the heated body armor panel 14 is moved through the roller pairs the heated body armor panel 14 is moved through various vertical positions, thereby breaking-in the heated body armor panel 14 to increase the flexibility of the finished, conditioned body armor panel 14.

Obviously, many modifications and variations of the present invention are possible in light of the above teachings. The invention may be practiced otherwise than as specifically described within the scope of the appended claims.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A body armor panel for use with a personal protective vest, comprising:
   an outer cover defining a panel assembly cavity; and
   a flexible ballistic material panel assembly positioned within the panel assembly cavity, the flexible ballistic material panel assembly including a plurality of layered material segments defined between a strike face and a wear face, each of the layered material segments including a different ballistic material, the plurality of layered material segments including:
   a first layered material segment including a single layer of a first ballistic material including Dyneema® HB50 defining the strike face;
   a second layered material segment adjacent the first layered material segment and including a plurality of layers of a second ballistic material including Dyneema® SB117; and
   a third layered material segment adjacent the second layered material segment and including a plurality of layers of a third ballistic material; and
   a fourth layered material segment adjacent the third layered material segment and defining the wear face;
   wherein the flexible ballistic material panel assembly is formed by:
   applying a first heat treatment to the plurality of layered material segments;
   applying a compression treatment to the heated plurality of layered material segments to form a hardened ballistic material panel assembly;
   applying a second heat treatment to the hardened ballistic material panel assembly; and
   applying a conditioning treatment to the heated hardened ballistic material panel assembly to form the flexible ballistic material panel assembly.

2. The body armor panel of claim 1, wherein the fourth layered material segment includes a plurality of second layers of the third ballistic material and a plurality of layers of a fourth ballistic material that is different than the third ballistic material, wherein each second layer of the third ballistic material is positioned between corresponding layers of the fourth ballistic material in an alternating layered arrangement.

3. The body armor panel of claim 2, wherein the second layered material segment includes six layers of the second ballistic material and the third layered material segment includes six layers of the third ballistic material.

4. The body armor panel of claim 1, wherein the second layered material segment includes four layers of the second ballistic material, the third layered material segment includes eight layers of the third ballistic material, and the fourth layered material segment includes four layers of a fourth ballistic material that is different than the third ballistic material.

5. A personal protective vest assembly comprising:
   a personal protective vest including an outer surface, an inner surface, and a ballistic panel pocket defined between the outer surface and the inner surface, the inner surface including a slot for accessing the ballistic panel pocket; and
   body armor panel removably positioned within the ballistic panel pocket, the body armor panel including:
   an outer cover defining a panel assembly cavity; and
   a flexible ballistic material panel assembly positioned within the panel assembly cavity, the flexible ballistic material panel assembly including a plurality of layered material segments defined between a strike face and a wear face, each of the layered material segments including a different ballistic material, the plurality of layered material segments including:
   a first layered material segment including a single layer of a first ballistic material including Dyneema® HB50 defining the strike face
   a second layered material segment adjacent the first layered material segment and including a plurality of layers of a second ballistic material including Dyneema® SB117; and
   a third layered material segment adjacent the second layered material segment and including a plurality of layers of a third ballistic material; and
   a fourth layered material segment adjacent the third layered material segment and defining the wear face;
   wherein the flexible ballistic material panel assembly is formed by:
   applying a first heat treatment to the plurality of layered material segments;
   applying a compression treatment to the heated plurality of layered material segments to form a hardened ballistic material panel assembly;
   applying a second heat treatment to the hardened ballistic material panel assembly; and
   applying a conditioning treatment to the heated hardened ballistic material panel assembly to form the flexible ballistic material panel assembly.

6. The personal protective vest assembly of claim 5, wherein the fourth layered material segment includes a plurality of second layers of the third ballistic material and a plurality of layers of a fourth ballistic material that is different than the third ballistic material, wherein each second layer of the third ballistic material is positioned between corresponding layers of the fourth ballistic material in an alternating layered arrangement.

7. The personal protective vest assembly of claim 6, wherein the second layered material segment includes six layers of the second ballistic material and the third layered material segment includes six layers of the third ballistic material.

8. The personal protective vest assembly of claim 5, wherein the second layered material segment includes four layers of the second ballistic material, the third layered material segment includes eight layers of the third ballistic material, and the fourth layered material segment includes four layers of a fourth ballistic material that is different than the third ballistic material.

* * * * *